United States Patent [19]

Jensen et al.

[11] Patent Number: 4,817,009

[45] Date of Patent: Mar. 28, 1989

[54] FURNACE ZONE TEMPERATURE CONTROL

[75] Inventors: Bruce A. Jensen; Terrence A. Davis, both of Bartlesville, Okla.

[73] Assignee: Applied Automation, Inc., Bartlesville, Okla.

[21] Appl. No.: 87,263

[22] Filed: Aug. 19, 1987

[51] Int. Cl.⁴ ............................................. G06F 15/46
[52] U.S. Cl. ................................... 364/477; 364/501; 364/557; 208/DIG. 1; 196/132; 236/15 BF; 236/78 B
[58] Field of Search ............... 364/500, 501, 557, 477; 236/15 BR, 15 BB, 15 BG, 15 BF, 78 A, 78 B; 208/85, 132, DIG. 1; 196/132; 432/95

[56] References Cited

U.S. PATENT DOCUMENTS

| | | | |
|---|---|---|---|
| 3,582,630 | 6/1971 | Koetsier | 364/477 X |
| 3,692,986 | 9/1972 | Nienstaedt et al. | 364/477 X |
| 4,035,620 | 7/1977 | Hobbs et al. | 235/151.1 |
| 4,090,065 | 5/1978 | Braytenbah et al. | 364/494 |
| 4,144,997 | 3/1979 | Anderson et al. | 236/15 BF |
| 4,354,242 | 10/1982 | Ganster et al. | 364/501 |
| 4,356,863 | 11/1982 | Furr | 208/DIG. 1 X |
| 4,380,317 | 4/1983 | Ryan | 236/15 BF |
| 4,557,686 | 12/1985 | LaSpisa | 431/5 |
| 4,612,111 | 9/1986 | Hofferber | 208/DIG. 1 X |

OTHER PUBLICATIONS

Liptak, B. G. Inst. Engr. Hdbook, vol. II, p. 733, Chilton Book Co, 1982.

*Primary Examiner*—A. D. Pellinen
*Assistant Examiner*—H. L. Williams
*Attorney, Agent, or Firm*—Laney, Dougherty, Hessin & Beavers

[57] ABSTRACT

A computer system for a zone fired furnace generates a plurality of temperature set point signals for a plurality of furnace zones. The set point signals are derived from a master controller acting on the measured temperature of fluid that is heated in the plurality of furnace zones and then combined to form a heated stream. The master signal, which is a velocity type signal, is provided to a plurality of zone control stations corresponding to the plurality of furnace zones. Each zone control station integrates the master signal, and then biases the master signal for use as a zone temperature set point. The zone control station can be used to bias the individual coils so as to balance the temperature of the coils with respect to each other, or to intentionally unbalance one or more coils, as desired, so as to improve furnace operations. In addition a tracking signal is generated in each zone control station which accurately tracks the set point of it's associated zone temperature controller to facilitate automatic bumpless transfer from manual to automatic even when a zone temperature is limited to a maximum or minimum value.

14 Claims, 2 Drawing Sheets

FURNACE ZONE TEMPERATURE CONTROL

The present invention relates to furnace control. In one aspect it relates to apparatus for controlling the temperature of a preheat furnace used for heating refinery fluids. In another aspect it relates to method and apparatus for tracking a plurality of set point signals which are derived from a common master signal.

Crude oil is typically preheated in a furnace prior to being introduced into a crude tower for separation of the various components contained in the crude oil. This preheating step represents a substantial economic cost in the processing of a crude oil feed because a substantial amount of fuel is required to supply the necessary heat. It is thus desirable to operate the furnace as efficiently as possible so as to substantially minimize the cost to preheat the crude oil.

In the case of a multi-zone preheat furnace a zone control station is typically provided for each zone for the purpose of optimizing (e.g. balancing) or intentionally unbalancing the heat load on each zone. Typically, control is achieved through a temperature controlled master signal which senses the temperature of the furnace effluent from the multi-zone preheat furnace. When furnace effluent temperature drops the master controller senses the change and calls for an increase in temperature for all zones. The master signal is passed to each individual zone temperature controller through its zone control station. The zone control station accepts the master signal and multiplies the master signal by a bias signal which represents the fraction of the total heat load which is to be supplied by that particular zone. This bias may be entered by an operator as a fixed percentage for a particular zone, or it may be supplied by a computer program. Since there are numerous combinations of zone temperatures that, when combined, would produce the desired final temperature, the computer program could continuously adjust the bias for each zone for optimizing the furnace according to some specific criteria.

Irregardless of how the bias is applied to the zone temperature controllers, it is difficult to balance the zone temperatures with respect to each other because of different heating coil geometry, different heat transfer coefficients, different zone efficiencies, etc. for each zone. It is thus necessary to provide maximum and minimum temperature limits for protection of the furnace zones since one zone can overheat while another zone is too cool.

During the normal course of operation of the multi-zone preheat furnace, it often happens that a temperature limit is exceeded for a particular zone. This limiting condition can result in a windup condition for the zone temperature controller that is limited. The typical solution for preventing windup involves providing a tracking signal for the controller. However, a problem arises in providing a tracking signal for the master controllers when one or more zones are limited, or are manually controlled. In this event without a tracking signal for the master controller, automatic bumpless transfer of the zone controllers from manual to automatic is impossible.

It is thus an object of this invention to provide method and apparatus for supplying a master signal to a plurality of zone control stations, and then to proportion the master signal among the plurality of zone temperature controllers such that the overall heat transfer efficiency of the furnace is improved. It is a further object of this invention to provide an independent tracking signal for each zone which accurately tracks the set point of the zone temperature controller even when one or more zones are operated independently of the master signal. It is a still further object of this invention to provide a tracking signal to facilitate automatic bumpless transfer from manual to automatic mode for the plurality of zone temperature controllers.

In accordance with one aspect of the present invention method and apparatus are provided whereby a computer controller having a velocity type output signal is utilized as a master controller. The velocity type output signal, which is digital pulse train representative of the change required in the manipulated device, is provided to the zone control station for each zone.

Each zone control station includes an auto/manual switch and a bias entry device for use by an operator. In addition the zone control station has computational capacity for integrating the master signal provided from the master controller. In each zone control station the master signal is provided to an integrator computer block which serves to sum or integrate the digital pulses contained in the velocity type master signal to provide a continuous signal for use by the zone temperature controller. The integrator block is also provided with a tracking signal which is incorporated into the integration algorithm to prevent windup of the integrator if, for example, the integrator output exceeds a limiting value.

In normal operation the integrator output signal is multiplied by its bias signal and the thus biased signal is passed to limit blocks which can limit the biased signal, if necessary, to prevent excessive high or low temperatures in the furnace zone. The output of the limit block is provided as a set point signal to its associated zone temperature controller and is also provided as a numerator input to a computer division block. In the computer division block the set point signal is divided by its' bias signal to generate the tracking signal for the integrator block. In this manner, if the set point signal for one zone is constrained for example by a high temperature limit, the tracking signal limits the integrator output for the constrained zone to prevent windup of its integrator without affecting signals associated with any other zone.

Other objects and advantages of the invention will be apparent from the foregoing Brief Description of the Invention and the claims as well as the Detailed Description of the Drawings in which:

The invention is described in terms of a crude oil preheat furnace having four zones. However the invention is applicable to furnaces having different numbers of zones. Also the furnace might contain multiple burners for each zone and multiple process streams may be provided to each furnace zone. Also the furnace might be used for a large variety of purposes besides heating refinery fluids.

Figure 1:
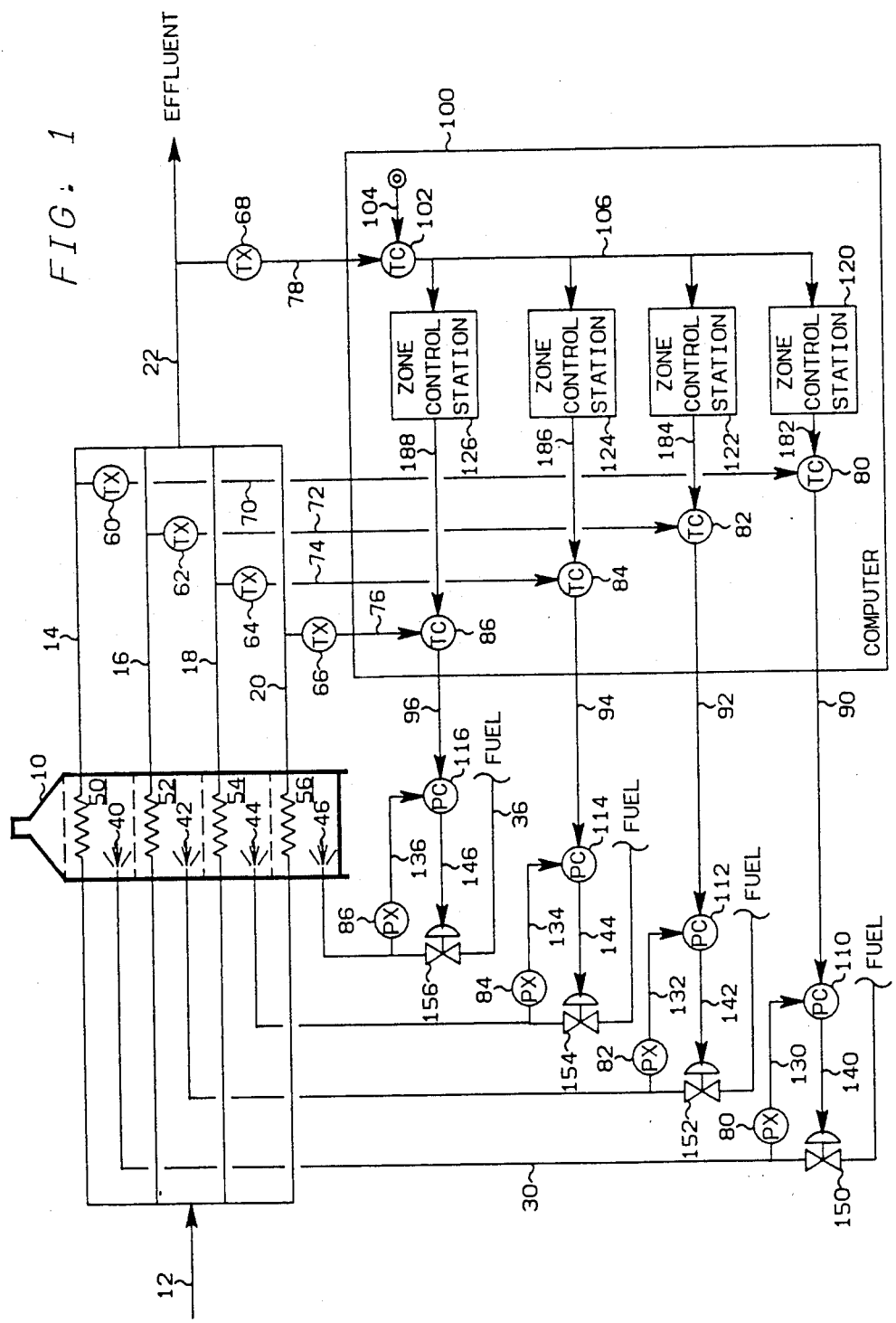
FIG. 1 is a diagrammatic illustration of a furnace with zone firing and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperatures.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signals handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a refinery fluid such as a crude oil feed is illustrated as flowing in conduit means 12. The fluid flow through conduit means 12 is divided into four streams which flow through conduit means 14, 16, 18 and 20. The refinery fluid is heated in preheat furnace 10 and the four streams are recombined in conduit means 22. After flowing through the preheat furnace 10 crude oil flowing in conduit means 22 would typically be provided to a fractional distillation column, not illustrated.

Conduit means 14, 16, 18 and 20 are considered as individual heating coils in furnace 10 and are located in separate zones of furnace 10. Fuel is supplied through conduit means 30 to a burner 40 which supplies heat to coil 14 in zone 50. In like manner fuel is supplied through conduit means 32, 34 and 36 to burners 42, 44 and 46 respectively to heat coils 16, 18 and 20 respectively which are located in zones 52, 54 and 56 respectively.

The preheating of refinery fluid in streams flowing in conduit means 14, 16, 18 and 20 described to this point is conventional. It is the manner in which the control signals are generated and applied to control furnace 10 which provides the novel features of this invention. First the process measurements required for control of the furnace 10 will be described, thereafter the manner in which the process measurements and computer inputs supplied by an operator are utilized to generate the control signals will be described.

Temperature transducer 60 in combination with a temperature sensing device such as a thermocouple which is operably located in conduit means 14, provides an output signal 70 which is representative of the actual temperature of the fluid flowing in conduit means 14. Signal 70 is provided from temperature transducer 60 as an input to computer 100 and further provided as a process variable input to zone temperature controller 80. In like manner, temperature transducer 62, 64, 66 and 68 in combination with temperature sensing devices such as thermocouples which are operably located in conduit means 16, 18, 20 and 22 respectively provide output signals 72, 74, 76 and 78 respectively which are representative of the actual temperatures of the fluid flowing through conduit means 16, 18, 20 and 22 respectively. Signal 72, 74, 76 and 78 are provided from temperature transducers 62, 64, 66 and 68 respectively as inputs to computer 100. Signal 72, 74 and 76 are process variable inputs for zone temperature controllers 82, 84 and 86 respectively.

In response to the above-described inputs computer 100 provides four control signals, 90, 92, 94 and 96 which are representative of the firing rate for furnace zone 50, 52, 54 and 56 respectively. Control signals 90, 92, 94 and 96 are provided as set point for pressure controllers 110, 112, 114 and 116 respectively which manipulate fuel flow to the furnace zones 50, 52, 54 and 56 respectively. It is noted that control signals 90, 92, 94 and 96 could be provided to flow controllers instead of pressure controllers to manipulate fuel flow to the various furnace zones. However pressure controllers are preferred to flow controllers for manipulating fuel flow to the furnace 10.

Pressure transducer 80 in combination with a pressure measuring device operably located in conduit means 30, provides an output signal 130 which is representative of the actual pressure of the fluid in conduit means 30. Signal 130 is provided from pressure transducer 80 as a process variable input to pressure controller 110. In response to signals 130 and 90 pressure controller 110 provides an output signal 140 which is responsive to the difference between signals 130 and 90. Signal 140 is scaled so as to be representative of the position of control valve 150 which is operably located in conduit means 30 required to maintain the pressure of the fluid flowing in conduit means 30 substantially equal to the desired pressure represented by control signal 90.

In a similar manner, pressure transducer 82, 84 and 86 in combination with pressure measuring devices operably located in conduit means 32, 34 and 36 respectively provide output signals 132, 134 and 136 respectively which are representative of the actual pressure of the fluid flowing in conduit means 32, 34 and 36 respectively. Signals 132, 134 and 136 are provided from pressure transducers 82, 84 and 86 respectively as process variable inputs to pressure controllers 112, 114 and 116 respectively. In response to set point signals 92, 94 and 96 and corresponding process variable signals 132, 134 and 136 pressure controllers 112, 114 and 116 provide output signals 142, 144 and 146 respectively which are scaled to be representative of the positions of control valves 152, 154 and 156 respectively required to maintain the actual pressure of the fluid in conduit means 32, 34 and 36 substantially equal to set point signals 90, 94 and 96 respectively.

Signal 78 which is representative of the temperature of the fluid flowing in conduit means 22 is provided to temperature controller 102 as illustrated in FIG. 1. Temperature controller 102 digitally represents the action of a conventional three mode electronic controller. However controller 102 is programmed with a velocity type algorithm which means that its output is the change that the manipulated device or variable should undergo between successive executions of the algorithm. The output is typically a digital pulse train, therefore, integration must be done by the element receiving the controller output. The major advantage of utilizing a velocity type algorithm is its insensitivity to reset windup.

Temperature controller 102 is also provided with set point signal 104 which is representative of the desired temperature for the fluid flowing in conduit means 22. In response to signals 78 and 104 temperature controller 102 provides an output signal 106 which is representative of the change in temperature of the refinery fluid flowing in conduit means 22 required to maintain the actual temperature of the fluid flowing in conduit means 22 substantially equal to the desired temperature represented by set point signal 104. Signal 106 is provided in parallel to zone control stations 120, 122, 124 and 126.

Figure 2:
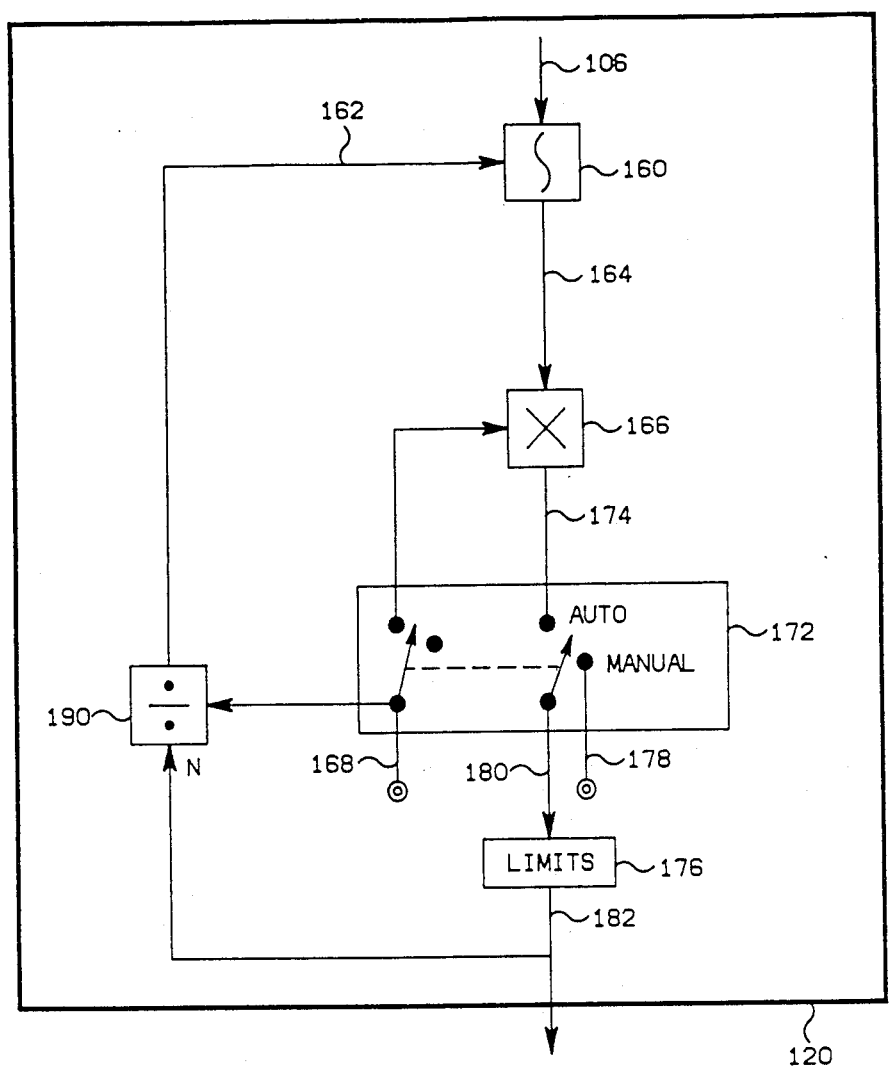
FIG. 2 is a diagrammatic illustration of a zone control station illustrated in FIG. 1, including a block diagram of the computer logic utilized to generate the tracking signal.

Referring now to FIG. 2 there is illustrated a zone control station, which is typical of zone control stations 120, 122, 124 and 126 illustrated in FIG. 1. Signal 106 is provided as a first input to integrator computer block 160. As previously mentioned signal 106 is a digital pulse train representative of the required change in the temperature of furnace 10. Integrator computer block 160 is also supplied with signal 162 which is the tracking signal for integrator block 160. In response to signals 106 and 162 integrator computer block 160 provides an output signal 164 which is responsive to signals 162 and 106. The output signal provided by integrator computer block 160 as represented by signal 164 may be expressed as:

$$S = T_K + \sum_{n-1}^{n} \phi_{(t)}$$

where:
S=Integrator output, signal 164
$T_K$=Tracking signal, signal 162
$\Phi$=Velocity controller output, signal 106
n=current algorithm execution
n-1=current algorithm execution Thus the integrator computer block 160 serves to sum or integrate the digital pulse output signal of velocity controller 106 by incrementing or decrementing the integrator output, if required, for each execution of the integrator algorithm. However, the tracking variable, as indicated in the above expression for the integrator output signal 164, resets the integrator for each execution of the algorithm to provide the position type output signal required for its associated zone controller.

Signal 164 is provided as a first input to multiplying block 166. Signal 168, which is illustrated as an operator entered signal in FIG. 2, is a bias signal provided through auto/manual switch 172 as a second input to multiplying block 166. Bias signal 168 represents a desired change in the temperature represented by signal 164 for the furnace zone associated with signal 164 so as to optimize the heating of the refinery fluid flowing through furnace 10. For example, if one furnace zone is more efficient than a second zone, the temperature of the first zone could be increased and the temperature of the second zone could be decreased while still maintaining the desired temperature for the fluid flowing through conduit means 22. In this manner the operation of furnace 10 could be substantially optimized.

Signal 164 is multiplied by signal 168 in multiplying block 166 to produce signal 174 which is representative of the desired temperature of the refinery fluid flowing in conduit means 14 which will maintain the actual temperature in conduit means 22 substantially equal to the desired temperature represented by signal 104. Signal 174 is provided through the auto/manual switch 172 to the limit block 176. Signal 178 is representative of a manually entered set point for a zone temperature controller such as zone temperature controller 80 which is associated with zone control station 120.

Depending on the position of the auto/manual switch 172 signal 174 or 178 is provided as signal 180 to the limit block 176. As previously indicated limit block 176 includes both high and low limit values in order to restrict the value of signal 180 as required for safe operation of the furnace 10.

Signal 182 is provided as a set point signal to zone temperature controller 80 and is also provided as the numerator input to division computer block 190. Bias signal 168 is also provided to division block 190, and signal 182 is divided by signal 190 to establish the tracking signal 162. Signal 162 is utilized in the integrator computer block 160 as previously described. In this manner signal 162 tracks signal 182 even though signal 182 is limited, or is provided from a manual input to the auto/manual switch 172. In a similar manner set point signals 184, 186 and 188 are provided to zone temperature controllers 82, 84, and 86 respectively from zone control stations 122, 124 and 126 respectively as illustrated in FIG. 1.

In response to signals 182 and 70 zone temperature controller 80 provides an output signal 90 which is responsive to the difference between signals 182 and 70. Signal 90 is scaled so as to be representative of the pressure in fuel conduit means 30 required to maintain the actual temperature in conduit means 14 substantially equal to the desired temperature represented by signal 182.

In a similar manner zone temperature controller 82 responds to signals 72 and 184 to provide an output signal 92 which is scaled so as to be representative of the pressure in fuel conduit means 32 required to maintain the actual temperatures in conduit means 16 substantially equal to the desired temperature represented by signal 184. Zone temperature controller 84 responds to signals 74 and 186 to provide an output signal 94 and controller 86 responds to signals 76 and 188 to provide an output signal 96. Signals 94 and 96 are scaled to be representative of the pressure in conduit means 34 and 36 respectively required to maintain the actual temperature in conduit means 18 and 20 respectively substantially equal to the desired temperature represented by signals 186 and 188 respectively.

In summary the control system of the present invention generates a plurality of set point signals for temperature control of a corresponding plurality of furnace zones. The plurality of set point signals are derived from a single temperature control signal, however, an individual bias signal is provided for each furnace zone so that the temperature, or the combustion fuel supplied to each zone, can be varied with respect to the other zones. In addition a tracking signal is provided for each furance zone to implement bumpless transfer when switching from manual to automatic operation.

The invention has been described in terms of a preferred embodiment as illustrated in FIGS. 1 and 2. Specific components used in the practice of the invention as illustrated in FIG. 1 such as pressure transducers 80, 82, 84 and 86; temperature transducers 60, 62, 64, 66 and 68; pressure controllers 110, 112, 114 and 116; temperature controllers 80, 82, 84, 86 and 102; and control valves 150, 152, 154 and 156 are each well known, commercially available control components such as are described at length in Perry's Chemical Engineers Handbook, 5th Edition, Chapter 22, McGraw-Hill.

For reasons of brevity, conventional auxiliary equipment such as pumps, additional heat exchangers, additional measurement control devices, etc. have not been included in the above description as they play no part in the explanation of the invention.

While the invention has been described in terms of the presently preferred embodiment, reasonable variations and modifications are possible by those skilled in the control systems art and such variations and modifications are within the scope of the described invention and the appended claims.

That which is claimed is:

1. Apparatus comprising:
    a furnace having at least a first and a second heating zone wherein said first heating zone contains a first heating coil and said second heating zone contains a second heating coil;
    means for flowing a fluid to be heated through said first heating coil and said second heating coil to heat said fluid, and for combining the heated fluid flowing out of said first heating coil and said second heating coil to form a heated fluid stream;
    means for supplying a first fuel stream to said first heating zone, wherein the combustion of said first fuel stream in said first heating zone supplies heat to the fluid flowing in said first heating coil;
    means for supplying a second fuel stream to said second heating zone, wherein the combustion of said second fuel stream in said second heating zone supplies heat to the fluid flowing in said second heating coil;
    means for establishing a first signal representative of the actual temperature of said heated fluid stream;
    means for establishing a second signal representative of the desired temperature of said heated fluid stream;
    means for comparing said first signal and said second signal and for establishing a third signal which is responsive to the difference between said first signal and said second signal, wherein said third signal is a velocity type digital pulse signal which is scaled so as to be representative of the temperature change required in said first and second heating zones to maintain the temperature of said heated fluid stream substantially equal to the desired temperature represented by said second signal;
    a first and a second integrator means;
    means for establishing a first and a second tracking signal, wherein said first and said second tracking signals are both responsive to said third signal;
    means for providing said first tracking signal to said first integrator means and for providing said second tracking signal to said second integrator means;
    means for providing said third signal to said first integrator means, wherein the digital pulses contained in said third signal are integrated and the integration result of said third signal is combined with said first tracking signal to establish a fourth signal which is responsive to said third signal and said first tracking signal and wherein said fourth signal is a continuous signal which is representative of a first desired temperature for the fluid in said first heating coil for maintaining the actual temperature of said heated fluid stream substantially equal to the desired temperature represented by said second signal;

means for providing said third signal to said second integrator means, wherein the digital pulses contained in said third signal are integrated and the integration result of said third signal is combined with said second tracking signal to establish a fifth signal which is responsive to said third signal and said second tracking signal and wherein said fifth signal is a continuous signal which is representative of a first desired temperature of the fluid in said second heating coil for maintaining the actual temperature of said heated fluid stream substantially equal to the desired temperature represented by said second signal; and means for manipulating the temperature of said first heating zone in response to said fourth signal and for manipulating the temperature of said second heating zone in response to said fifth signal.

2. Apparatus in accordance with claim 1, wherein said means for manipulating the temperature of said first heating zone in response to said fourth signal and said means for manipulating the temperature of said second heating zone in response to said fifth signal comprises:

means for establishing a sixth signal representative of a first bias factor, wherein said first bias factor indicates the desired percentage of the total heat load of said furnace which is to be supplied by said first heating zone;

means for establishing a seventh signal representative of a second bias factor, wherein said second bias factor indicates the desired percentage of the total heat load of said furnace which is to be supplied by said second heating zone;

means for changing the magnitude of said fourth signal based on said sixth signal and for establishing an eighth signal which is responsive to said fourth signal and said sixth signal, wherein said eighth signal is representative of a second desired temperature of the fluid in said first heating coil for maintaining the actual temperature of said heated fluid stream substantially equal to the desired temperature represented by said second signal;

means for changing the magnitude of said fifth signal based on said seventh signal and for establishing a ninth signal which is responsive to said fifth signal and said seventh signal, wherein said ninth signal is representative of a second desired temperature of the fluid in said second heating coil for maintaining the actual temperature of said heated fluid stream substantially equal to the desired temperature represented by said second signal; and means for manipulating the temperature of said first heating zone in response to said eighth signal, and for manipulating the temperature of said second heating zone in response to said ninth signal.

3. Apparatus in accordance with claim 2 wherein said means for establishing said first tracking signal comprises:

a first limit means for restricting the value of an output signal to prevent an undesired operating condition, wherein said first limit means includes a high limit value and a low limit value;

a first division means for accepting data and providing the results;

means for providing said eighth signal to said first limit means and for establishing a tenth signal which is equal to said eighth signal if the value of said eighth signal is between said high limit value and said low limit value, and is equal to said high limit value if said eighth signal exceeds said high limit value and is equal to said low limit value if said eighth signal is less than said low limit value; and means for providing said tenth signal and said sixth signal to said first division means, wherein said tenth signal is divided by said sixth signal to establish said first tracking signal.

4. Apparatus in accordance with claim 3 wherein said means for establishing said second tracking signal comprises:

a second limit means for restricting the value of an output signal to prevent an undesired operating condition, wherein said second limit means includes a high limit value and a low limit value;

a second division means for accepting data and providing the results;

means for providing said ninth signal to said second limit means and for establishing an eleventh signal which is equal to said ninth signal if the value of said ninth signal is between said high limit value and said low limit value, and is equal to said high limit value if said ninth signal exceeds said high limit value, and is equal to said low limit value if said ninth signal is less than said low limit value; and means for providing said eleventh signal and said seventh signal to said second division means wherein said eleventh signal is divided by said seventh signal to establish said second tracking signal.

5. Apparatus in accordance with claim 2 wherein said means for manipulating the temperature of said first heating zone in response to said eighth signal and for manipulating the temperature of said second heating zone in response to said ninth signal comprises:

means for establishing a tenth signal representative of the actual temperature of the heated refinery fluid flowing out of said first heating coil, and for establishing an eleventh signal representative of the actual temperature of the heated fluid flowing out of said second heating coil;

means for comparing said eighth signal and said tenth signal and for establishing a twelfth signal which is responsive to the difference between said eighth signal and said tenth signal, wherein said twelfth signal is scaled so as to be representative of the pressure of said first fuel stream required to maintain the temperature of the fluid flowing out of said first heating coil substantially equal to the desired temperature represented by said eighth signal.

means for comparing said ninth signal and said eleventh signal and for establishing a thirteenth signal which is responsive to the difference between said ninth signal and said eleventh signal, wherein said thirteenth signal is scaled so as to be representative of the pressure of said second fuel stream required to maintain the temperature of the refinery fluid flowing out of said second heating coil substantially equal to the desired temperature represented by said ninth signal; and means for manipulating the pressure in said first fuel stream in response to said twelfth signal, and for manipulating the pressure in said second fuel stream in response to said thirteenth signal.

6. Apparatus in accordance with claim 4 additionally comprising:
   a first and a second zone temperature controller;
   means for entering a first local set point for said first zone temperature controller;
   a first auto/manual switch having a double pole single throw configuration, wherein a first pole of said first auto/manual switch changes the input to said first limit means between said eighth signal and said first local set point, and a second pole of said first auto/manual switch enables said sixth signal to change the magnitude of said fourth signal when said eighth signal is selected for the input to said first limit means;
   means for entering a second local set point for said second zone temperature controller; and
   a second auto/manual switch having a double pole single throw configuration wherein a first pole of said second auto/manual switch changes the input for said second limit means between said ninth signal and said second local set point, and a second pole of said second auto/manual switch enables said seventh signal to change the magnitude of said fifth signal when said ninth signal is selected for the input to second limit means.

7. Apparatus in accordance with claim 6 wherein said first auto/manual switch connects said first local set point to said first limit means and wherein said first tracking signal follows said first local set point, and wherein said second auto/manual switch connects said ninth signal to said second limit means.

8. Apparatus in accordance with claim 5 wherein said fluid is crude oil.

9. A method for controlling a furnace heating process wherein a fluid is heated in a multi-zone furnace having at least a first heating zone containing a first heating coil and a second heating zone containing a second heating coil, and wherein a first fuel stream is combusted in said first heating zone to heat the fluid flowing in said first heating coil and wherein a second fuel stream is combusted in said second heating zone to heat the fluid flowing in said second heating coil, said method comprising the steps of:
   establishing a first signal representative of the actual temperature of said heated fluid stream;
   establishing a second signal representative of the desired temperature of said heated fluid stream;
   comparing said first signal and said second signal and establishing a third signal which is responsive to the difference between said first signal and said second signal, wherein said third signal is a velocity type digital pulse signal which is scaled so as to be representative of the temperature change required in said first and said second heating zones to maintain the temperature of said heated fluid stream substantially equal to the desired temperature represented by said second signal;
   establishing a first and a second tracking signal, wherein said first and said second tracking signals are both responsive to said third signal;
   integrating the digital pulses contained in said third signal and combining the integration result of said third signal with said first tracking signal to establish a fourth signal which is responsive to said third signal and said first tracking signal, wherein said fourth signal is a continuous signal which is representative of a first desired temperature for the fluid in said first heating coil for maintaining the actual temperature of said heated fluid stream substantially equal to the desired temperature represented by said second signal;
   integrating the digital pulses contained in said third signal and combining the integration result of said third signal with said second tracking signal to establish a fifth signal which is responsive to said third signal and said second tracking signal, wherein said fifth signal is a continuous signal which is representative of a first desired temperature for the fluid in said second heating coil for maintaining the actual temperature of said heated fluid stream substantially equal to the desired temperature represented by said second signal; and
   manipulating the temperature of said first heating zone in response to said fourth signal and manipulating the temperature of said second heating zone in response to said fifth signal.

10. A method in accordance with claim 9 wherein said step for manipulating the temperature of said first heating zone in response to said fourth signal and said step for manipulating the temperature of said second heating zone in response to said fifth signal comprises:
    establishing a sixth signal representative of a first bias factor wherein said first bias factor indicates the desired percentage of the total heat load of said furnace which is to be supplied by said first heating zone;
    establishing a seventh signal representative of a second bias factor, wherein said second bias factor indicates the desired percentage of the total heat load of said furnace which is to be supplied by said second heating zone;
    changing the magnitude of said fourth signal based on said sixth signal and for establishing an eighth signal which is responsive to said fourth signal and said sixth signal, wherein said eighth signal is representative of a second desired temperature of the refinery fluid flowing in said first heating coil for maintaining the actual temperature of said heated refinery fluid stream substantially equal to the desired temperature represented by said second signal;
    changing the magnitude of said fifth signal based on said seventh signal and for establishing a ninth signal which is responsive to said fifth signal and said seventh signal, wherein said ninth signal is representative of a second desired temperature of the refinery fluid flowing in said second heating coil for maintaining the actual temperature of said heated fluid stream substantially equal to the desired temperature represented by said second signal; and
    manipulating the temperature of said first heating zone in response to said eighth signal, and manipulating the temperature of said second heating zone in response to said ninth signal.

11. A method in accordance with claim 10 wherein said step for establishing said first tracking signal comprises:
    establishing a tenth signal which is equal to said eighth signal if the value of said eighth signal is between a high limit value and a low limit value, and is equal to said high limit value if said eighth signal exceeds said high limit value and is equal to said low limit value if said eighth signal is less than said low limit value; and dividing said tenth signal by said sixth signal to establish said first tracking signal.

12. A method in accordance with claim 11 wherein said step for establishing said second tracking signal comprises:

establishing an eleventh signal which is equal to said ninth signal if the value of said ninth signal is between a high limit value and a low limit value, and is equal to said high limit value if said ninth signal exceeds said high limit value and is equal to said low limit value if said ninth signal is less than said low limit value; and dividing said eleventh signal by said seventh signal to establish said second tracking signal.

13. A method in accordance with claim 10 wherein said step for manipulating the temperature of said first heating zone in response to said eighth signal and for manipulating the temperature of said second heating zone in response to said ninth signal comprises:

establishing a tenth signal representative of the actual temperature of the heated fluid flowing out of said first heating coil and establishing an eleventh signal representative of the actual temperature of the heated fluid flowing out of said second heating coil;

comparing said eighth signal and said tenth signal and establishing a twelfth signal which is responsive to the difference between said eighth signal and said tenth signal, wherein said twelfth signal is scaled so as to be representative of the pressure of said first fuel stream required to maintain the temperature of the fluid flowing out of said first heating coil substantially equal to the desired temperature represented by said eighth signal;

comparing said ninth signal and said eleventh signal and establishing a thirteenth signal which is responsive to the difference between said ninth signal and said eleventh signal, wherein said thirteenth signal is scaled so as to be representative of the pressure of said second fuel stream required to maintain the temperature of the fluid flowing out of said second heating coil substantially equal to the desired temperature represented by said ninth signal; and manipulating the pressure in said first fuel stream in response to said twelfth signal and manipulating the pressure in said second fuel stream in response to said thirteenth signal.

14. A method in accordance with claim 12 wherein a first auto/manual switch is associated with said first zone temperature controller and a second auto/manual switch is associated with said second zone temperature controller, said method additionally comprising the steps of:

entering a manual set point for a first zone temperature controller through said first auto/manual switch, wherein said first tracking signal follows said manual set point; and providing said ninth signal through said second auto/manual switch for a set point signal to said second zone temperature controller, wherein said second tracking signal follows said ninth signal.

* * * * *

UNITED STATES PATENT AND TRADEMARK OFFICE
CERTIFICATE OF CORRECTION

PATENT NO. : 4,817,009

DATED : March 28, 1989

INVENTOR(S) : Bruce A. Jensen and Terrence A. Davis

It is certified that error appears in the above-identified patent and that said Letters Patent is hereby corrected as shown below:

Column 1, line 51, delete "the" and insert --a-- therefor.

Column 3, line 61, delete "temperatures" and insert --temperature-- therefor.

Column 6, line 41, delete "current" and insert --previous-- therefor.

Column 7, line 61, delete "furance" and insert --furnace-- therefor.

Signed and Sealed this

Twenty-sixth Day of September, 1989

Attest:

DONALD J. QUIGG

*Attesting Officer*  *Commissioner of Patents and Trademarks*